Aug. 22, 1961  K. M. STÖCKER  2,997,319
CAP UNIT FOR USE IN CONNECTION WITH MINING
Filed April 16, 1959  2 Sheets-Sheet 1

United States Patent Office 2,997,319
Patented Aug. 22, 1961

2,997,319
CAP UNIT FOR USE IN CONNECTION WITH MINING
Karl Max Stöcker, Wattenscheid, Germany, assignor to Hermann Schwarz Kommanditgesellschaft, Wattenscheid, Germany
Filed Apr. 16, 1959, Ser. No. 806,964
Claims priority, application Germany Apr. 22, 1958
6 Claims. (Cl. 287—99)

There has been suggested a cap unit comprising caps foldable relative to each other, in which one cap is provided with an extension adapted to engage a fork-shaped portion of the other cap and provided with studs for engaging a groove of a transverse bearing member extending through said fork.

With this type of cap unit the bearing member designed as wedge has its back resting against an insert member which is so designed and movable that the movement of said insert member brings about a change in the distance between the transverse bearing member and the extension connected to the other cap.

According to a preferred form of the said arrangement, said insert member is designed as a wedge extending through a passage in said fork.

It is an object of the present invention to provide an improved cap unit of the above general type.

It is a further object of this invention to provide a cap unit of the above mentioned type in which said insert member when designed as wedge and the transverse bearing member will not affect each other.

These and other objects and advantages of the invention will appear more clearly from the following specification in connection with the accompanying drawings, in which.

Figure 1:
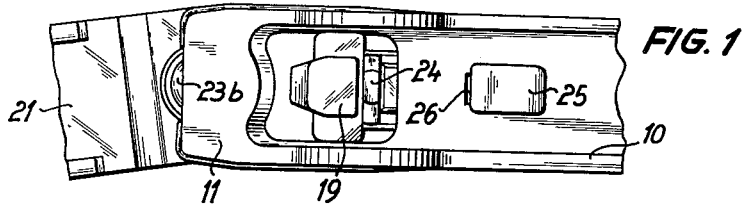
FIG. 1 is a side view of a cap unit with foldable caps provided, in conformity with the present invention, with a movable insert member between the transverse bearing member and the clamping element.

The cap unit according to the invention is characterized primarily in that a movable insert member is located between the transverse bearing member and the clamping of locking element. By means of said clamping of locking element it is possible to press the insert member firmly against the transverse bearing member.

In as much as the passage for the transverse bearing member of an arrangement according to the invention does not have to be much bigger than the cross section of the transverse bearing member, the moment of resistance of the fork is considerably improved over heretofore suggested cap units of the type involved.

According to a further feature of the invention, the clamping or locking element is wedge-shaped and the passage for said wedge-shaped clamping or locking element for pressing the insert member against the transverse bearing member is located at the rear portion of the fork or fork-shaped member, i.e. within a range in which the weakening of the moment of resistance of the fork is considerably less.

A further advantage of the arrangement according to the invention consists in that when the insert member is designed as wedge shape, the wedges will not affect each other.

Referring now to the drawing in detail, that cap which is supported by a mine prop and firmly connected thereto is designated with the reference numeral 10. The free end of cap 10 is fork-shaped and is provided with open eyes 12a and 12b having rotatably journalled therein studs 23a, 23b mounted on an extension 20 of the other cap 21. The outer end of said extension 20 has connected thereto stud-like extensions 22a and 22b (FIGS. 2 and 3) which engage an inclined groove 18 of the transverse bearing member 19. The said transverse bearing member 19 is located in a passage 17 and is secured against dropping out by means of abutment or cam members 28 and 29. One side of the insert member 24 rests against the back of the transverse bearing member 19, while the other side of said insert member 24 rests against a wedge 25 constituting the clamping or locking element. Wedge 25 is guided in a corresponding passage 26 at the rear end of the fork-shaped portion of cap 10 and is provided with abutment or cam members 15 and 16 in order to prevent wedge 25 from dropping out of the connection.

Figure 2:
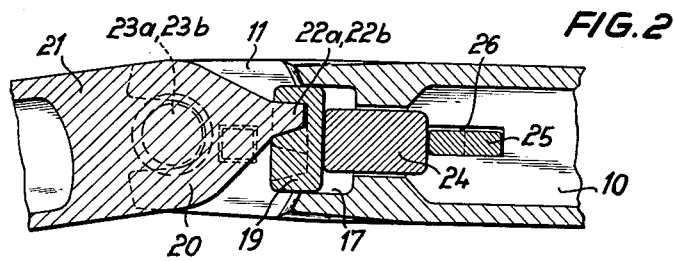
FIG. 2 is a section along the line II—II of FIG. 4.
Figure 3:
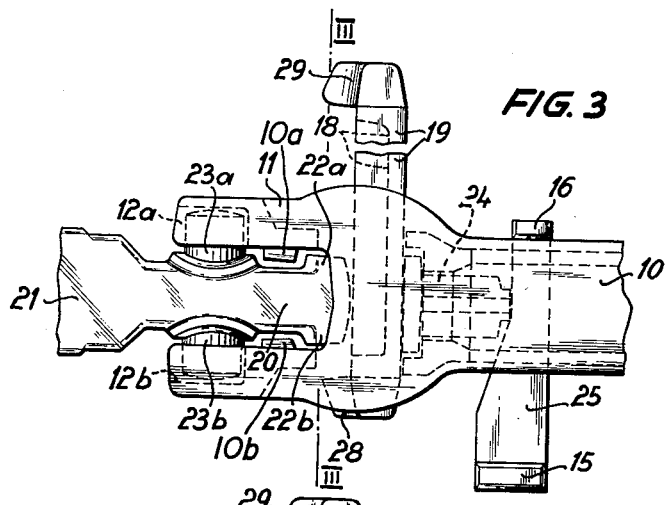
FIG. 3 is a top view of a cap unit according to the invention with the caps in unlocked condition.

As will be seen in FIGURES 2 and 3, the fork-shaped end portion of cap 10 is provided with projections 10a, 10b which are disposed between extensions 22a and 22b of cap member 21 and studs 23a and 23b. Projections 22a and 22b can be disengaged from projections 10a and 10b by a predetermined amount of relative rotation of the cap members but this amount of rotation is greater than can be had when cap member 21 is engaged by groove 18 of bearing member 19.

As will be evident from the above, the unit is in its unlocked position when the various elements occupy the position in FIG. 3. In this position, the stud-like extensions 22a and 22b of the extension member 20 do not engage groove 18 of the transverse bearing member 19.

Figure 4:
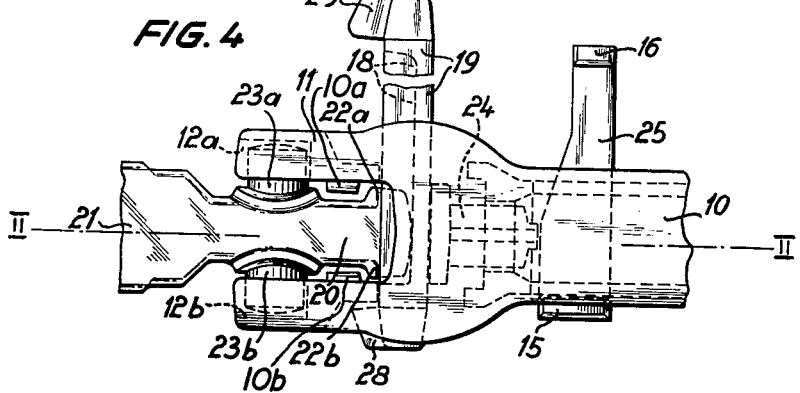
FIG. 4 is a top view similar to that of FIG. 3 of a cap unit according to the invention but with the caps shown in interlocked condition.
Figure 5:
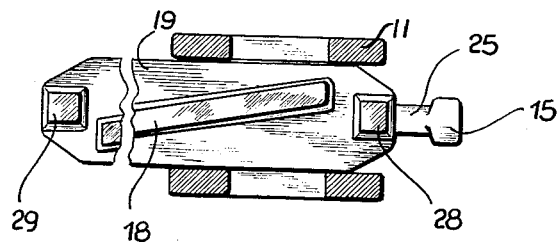
FIG. 5 is a section along the line III—III of FIG. 3.
Figure 6:
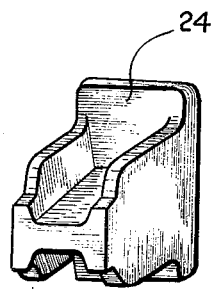
FIG. 6 is a perspective view of the insert member, which is interposed between the transverse bearing member and the clamping element.
Figures 7, 8:
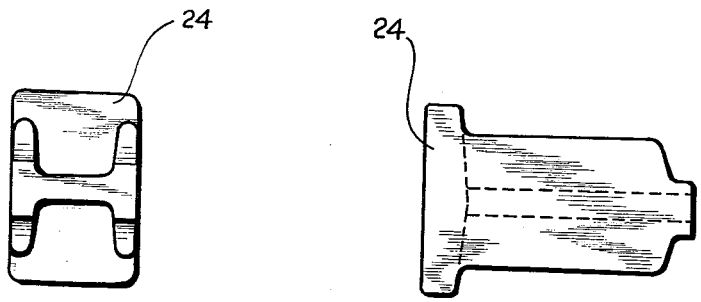
FIG. 7 is a front view of the insert member according to FIG. 6.
FIG. 8 is a side view of the insert member according to FIG. 6.

If the cap unit is to be locked, i.e. if the various elements are to be moved into the position shown in FIG. 4 representing the cap unit in locked condition, wedge 25 will be moved from FIG. 3 position into FIG. 4 position for instance by hammer blows. During this movement, the insert member 24 and thereby the transverse bearing member 19 are pressed in the direction toward cap 21. The stud-like extensions 22a and 22b will then be pressed into the transverse groove 18 of the transverse bearing member 19 whereby a pull and pressure resistant interlock of the cap members will be assured.

It is, of course, to be understood that the present invention is, by no means, limited to the particular construction shown in the drawing but also comprises any modifications within the scope of the appended claims.

What I claim is:

1. In combination in a cap unit for use in connection with mining: a first cap member having a fork-shaped portion with recess means and also having a portion with first and second passage means arranged one behind the other in spaced relationship to each other and extending transverse to said first cap member, a second cap member provided with stud means pivotally engaging said recess means, a transverse bearing member movably extending through that one of said passage means which is closest to said second cap member, said transverse bearing member being provided with a groove extending in longitudinal direction of said bearing member and inclined to the pivotal axis through said stud means, extension means connected to said second cap member for selective engagement with said groove, a clamping member movably extending through that one of said passage means which is remote from said second cap member, and an insert member interposed between said clamping member and said transverse bearing member and movable in longitudinal direction of said first cap member in response to clamping movement of said clamping member to thereby move said groove into engagement with said extension means.

2. An arrangement according to claim 1, in which said clamping member is wedge-shaped.

3. In a cap unit for use in connection with mining: first and second cap members having pivotally interengaging portions at their adjoining ends for connection of said cap member for relative pivotal movement about a transverse axis, the first of said cap members having a projecting portion extending longitudinally beyond said interengaging portions into the second cap member, a bearing member on said second cap member having transversely extending wedge means engaged with a radially extending surface on said projecting portion to lock said cap members against relative angular movement about said axis, said bearing member being movable in a direction parallel to said axis to position said wedge means to engage and lock said projecting portion in different angular positions of said cap members, said bearing member having limited movement toward and from said axis to move said wedge means into and out of locking position, an intermediate member movable longitudinally of said second cap member and engageable with said bearing member, and a clamping member extending through said second cap member and engageable with said intermediate member to move and clamp said bearing member with said wedge means in locking position.

4. In a cap unit for use in connection with mining: first and second cap members having pivotally interengaging portions at their adjoining ends for connection of said cap member for relative pivotal movement about a transverse axis, the first of said cap members having a projecting portion extending longitudinally beyond said interengaging portions into the second cap member, a bearing member on said second cap member having transverse abutment means inclined to said axis and engageable with a radially extending surface on said projecting portion to lock said cap members against relative angular movement about said axis, said bearing member being movable in a direction parallel to said axis and said abutment means being so inclined as to engage and lock said projecting portion and said cap member in different angular positions in different positions of said bearing member, said bearing member having limited movement toward and from said axis to move said abutment means into and out of locking position, an intermediate member movable longitudinally of said second cap member and engageable with said bearing member, and a clamping member extending through said second cap member and engageable with said intermediate member to move and clamp said bearing member with said abutment means in locking position.

5. In a cap unit as in claim 4, said bearing member and said clamping member each having formations on its ends preventing removal from said second cap member, said pivotally interengaging portions being disconnectable with said bearing member in unlocking position out of engagement with said projecting portion, and said bearing member, intermediate member and clamping member being retained on said second cap member by said formations.

6. In a cap unit as in claim 4, said pivotally interengaging portions being disengageable from each other upon relative angular movement of said first and second cap members, said bearing member in locking position preventing angular movement relatively of said cap members of a predetermined amount.

References Cited in the file of this patent

UNITED STATES PATENTS 2,749,712     Gerlach _____ June 12, 1956

FOREIGN PATENTS 760,604     Great Britain _____ Nov. 7, 1956